United States Patent
Kelly et al.

(10) Patent No.: US 8,087,013 B2
(45) Date of Patent: Dec. 27, 2011

(54) ASSISTED MIGRATION IN A DATA PROCESSING ENVIRONMENT

(75) Inventors: John Anthony Kelly, Hayling Island (GB); Mark Patrick Nuttal, Eastleigh (GB); Craig Howard Stirling, Southampton (GB); Mark Whitlock, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 1091 days.

(21) Appl. No.: 11/933,046

(22) Filed: Oct. 31, 2007

(65) Prior Publication Data
US 2008/0115123 A1      May 15, 2008

(30) Foreign Application Priority Data
Nov. 15, 2006   (GB) .................................. 0622738.3

(51) Int. Cl.
*G06F 9/44*          (2006.01)
*G06F 17/00*        (2006.01)
(52) U.S. Cl. ........................... 717/168; 717/171; 706/47
(58) Field of Classification Search ........................ None
See application file for complete search history.

(56) References Cited

U.S. PATENT DOCUMENTS

| | | | | |
|---|---|---|---|---|
| 6,199,204 | B1* | 3/2001 | Donohue | 717/178 |
| 6,654,950 | B1* | 11/2003 | Barnishan | 717/136 |
| 7,117,486 | B2* | 10/2006 | Wong et al. | 717/141 |
| 7,698,398 | B1* | 4/2010 | Lai | 709/223 |
| 7,756,832 | B1* | 7/2010 | Mowry et al. | 707/638 |
| 7,831,868 | B2* | 11/2010 | Bassin et al. | 714/47.1 |
| 2004/0068715 | A1* | 4/2004 | Wong et al. | 717/136 |
| 2004/0098419 | A1* | 5/2004 | Bantz et al. | 707/203 |
| 2005/0125281 | A1* | 6/2005 | Henrickson et al. | 705/10 |
| 2006/0010175 | A1* | 1/2006 | Kwong | 707/203 |

* cited by examiner

*Primary Examiner* — Tuan Dam
*Assistant Examiner* — Ben Wang
(74) *Attorney, Agent, or Firm* — Steven M. Greenberg, Esq.; Carey, Rodriguez, Greenberg & O'Keefe

(57) ABSTRACT

In assisting migration of data processing resources from a first operating environment to a second operating environment, a migration controller responds to a problem encountered during a migration process by invoking a network-based service to discover migration resources. A service provider makes migration resources available via the network-based service. The migration controller can obtain the latest migration rules and use them to resolve certain migration problems. The cooperation between the migration controller and network-based service can be automated to reduce reliance on manual updating of installed computer programs.

11 Claims, 7 Drawing Sheets

ASSISTED MIGRATION IN A DATA PROCESSING ENVIRONMENT

CROSS-REFERENCE TO RELATED APPLICATIONS

This application claims priority under 35 U.S.C. §119(a) to United Kingdom Patent Application Serial Number 0622738.3, filed Nov. 15, 2006, entitled METHODS AND APPARATUS FOR ASSISTED MIGRATION IN A DATA PROCESSING ENVIRONMENT, the entirety of which is incorporated herein by reference.

BACKGROUND OF THE INVENTION

The present invention relates to the migration of data processing resources from a first operating environment to another environment, such as migration of a computer program from a first version of an application-support-infrastructure product to a second version of the same product or to a superseding product.

Modern data processing systems are complex and rely on cooperation between a large number of integrated software and hardware components. That integration is made possible by widespread adoption of open standards by the component providers, but efficient interoperation often requires the different components of a system to implement complementary features. A change to one component may require complementary changes to other components of the system. The present invention addresses problems associated with making such complementary changes.

Many computer programs are referred to as application programs. Application programs perform operations that are directly relevant to functions requested by a user. Some simple examples are the functions of entering data into a spreadsheet application, creating a document using a word processing application, or adding meeting information into a calendar application. Some more complex examples implementing user-requested business functions include the front-end application program of an airline's online flight reservation system or the front-end ordering application of an online product ordering system.

Application programs such as spreadsheets require support from the underlying operating system, data storage components, firmware, processor and other hardware features of a computer on which the application runs. The operating system is an example of an application-support-infrastructure product.

In modern distributed and heterogeneous data processing networks in which different enterprises need to integrate their data processing operations, many application programs also benefit from additional support from so-called "middleware" components that form a support layer between an application program and the operating system. Middleware components include Web servers, application servers, messaging systems and content management systems, and are typically implemented in computer program code for cost reasons and to facilitate ongoing development (although it is well understood that various functions of typical computer programs can be implemented in electronic logic circuits as an alternative to program code). Middleware is another example of a type of application-support-infrastructure product.

Middleware can greatly simplify the task of creating application programs, by implementing a number of common tasks in a separate component that supports a variety of application programs. For example, messaging middleware can shield two communicating application programs from the complexity of network communications, so that the application does not need to know what communication protocols are used, what routes through the network are followed, and what data conversions are required when moving data between heterogeneous systems in a distributed network.

When changes are made to middleware or to an operating system or to other components of the application-support infrastructure within a data processing environment, it is sometimes necessary to also change the application programs which use that infrastructure to enable the application programs to continue making best use of the infrastructure. Such changes are known as "migrating" the application programs.

Some infrastructure changes, such as typical software patches applied to an existing version of an application server or messaging system, do not require application migration or reinstallation; if the application was functioning correctly before the change, the application will continue to function correctly without modification. Other changes require applications to be reinstalled and sometimes to be changed before or during reinstallation—such as when a middleware product is replaced by a later version that includes significant changes, or when a middleware product is replaced by a superseding product.

Unfortunately, application migration is a complex and error-prone task. Many customers that acquire middleware products and other application-support infrastructure products cannot perform migration without assistance. Service personnel are often provided by the middleware vendors to help with application migration, and tools known as "migration wizards" are sometimes also provided.

A migration wizard is a tool for controlling the modification of program code and associated data, such that a program that is targeted for one data processing environment will operate successfully in another data processing environment. As with other "wizards", a migration wizard includes a user interface that prompts the user when inputs are required (such as when a user is required to confirm an action, select from a set of options, or provide a password). A migration wizard typically modifies an application program so as to interoperate successfully with a changed application-support infrastructure product such as a middleware program. Migration wizards are known for use with products such as source code development tools, application servers, databases, monitoring tools, messaging systems and mail servers, for example.

Currently-available migration wizards do not provide sufficient support to avoid the need for service teams. A migration wizard may not be able to fully migrate a target application program, or the program's configuration information or application data, for a variety of reasons. These reasons can include unexpected configurations and bugs in the previous release of the middleware program or in the migration wizard itself.

Some middleware customers are willing to download and install the latest software patches for their middleware products, and this provides an opportunity for the middleware vendor to provide fixes for any bugs within the migration wizard at the same time as providing updates to the main middleware components. If a problem still arises when the migration wizard is invoked, the customer can work with a service team to complete the migration manually. However, a requirement for all customers to download the latest patch is typically unsatisfactory, because customers do not always want to upgrade their patch level—particularly if that means refreshing the entire product. Furthermore, manually performing migration of the application can be difficult, undocumented, error-prone or even impossible.

Therefore, there is a need for improved solutions for application migration. More generally, a set of complementary computer programs may need to be changed in a way that maintains interoperability and enables full use of the available functions. There is a need for improved migration for any data processing environment that includes a set of complementary data processing resources that require migration.

BRIEF SUMMARY OF THE INVENTION

One embodiment of the invention is a data processing system for supporting migration of data processing resources from a first operating environment to a second operating environment. The system includes a data processing unit, a data repository containing migration resources associated with known migration problems, and a resource selector. The resource selector responds to an identified migration problem by selecting migration resources associated with the identified problem from the data repository.

A second embodiment of the invention is as a method for use in migrating data processing resources from a first operating environment to a second operating environment. A request for migration report is received via a network. The request includes a problem identifier. Migration resources associated with the problem identifier are selected from a set of migration resources associated with known migration problems.

A third embodiment of the invention is as a computer program product for assisting migration of data processing resources from a first operating environment to a second operating environment. The computer program product includes a computer usable medium having computer usable program code. The computer usable program code includes code configured to receive, via a network, a request for migration support. The received request includes a problem identifier. The computer usable program code further includes code configured to select, from a set of migration resources associated with known migration problems, migration resources associated with the problem identifier.

DETAILED DESCRIPTION OF THE INVENTION

Figure 1:
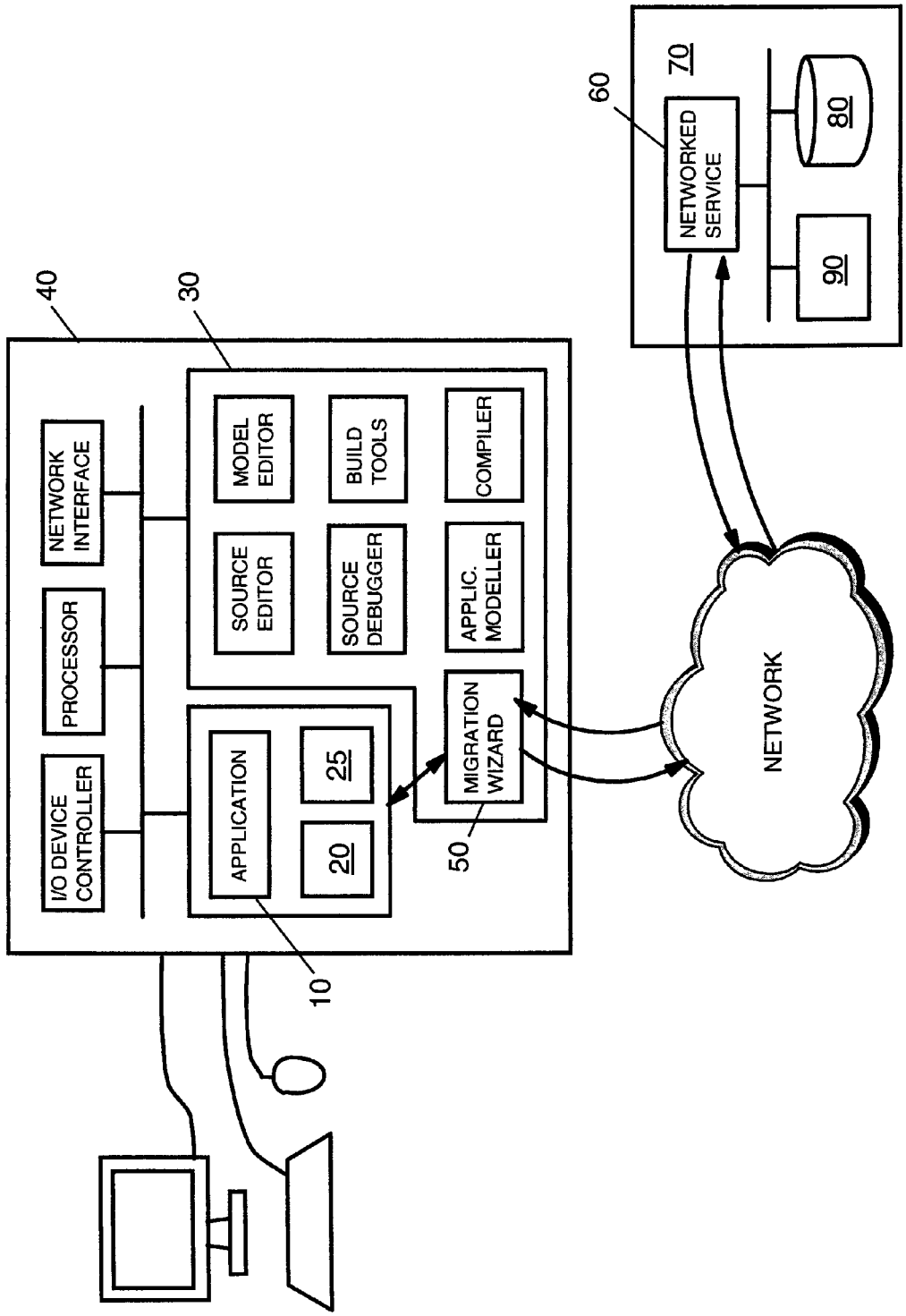
FIG. 1 is a schematic representation of a data processing network in which the invention is implemented, according to a first embodiment.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF (Radio Frequency), etc.

Computer program code for carrying out operations of the present invention may be written in an object oriented programming language such as JAVA, SMALLTALK, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

A first embodiment of the invention is described below with reference to FIGS. 1 to 4. Referring to FIG. 1, a software developer is able to work with an application program 10 and a first version of a middleware program 20 within an integrated development environment (IDE) 30. The application 10, middleware 20 and IDE 30 are implemented as computer programs running on a data processing apparatus 40. A typical IDE comprises a source code editor, a compiler and/or interpreter, build automation tools and a debugger. In this first embodiment, the developer is able to work with the source code of the application program and middleware. The data processing apparatus 40 may be any data processing system or device that is suitable for software development use, and which is capable of connecting to a network to enable invocation of and interaction with a network-based service, as described below.

A new version 25 of the middleware program is made available to the developer, as a replacement for the first version 20, together with a migration wizard 50 for assisting with migration of application programs 10 to the second version of the middleware program. The migration wizard is a first example of a migration controller that implements a set of steps of a migration process. The wizard includes a user interface to enable user interaction with the migration controller—prompting the user for inputs and reporting progress of migration operations. The migration wizard 50 according to this embodiment assists computer program developers to modify application program source code 10 to achieve successful interoperation with the new middleware product 25. Such developers are referred to as 'users' hereafter for simplicity.

Other embodiments of the invention include migration controllers that do not require user input and so are not implemented within a wizard. Additional embodiments are described for migration of run-time data processing resources since the present invention is not limited to a program development environment.

Figure 2:
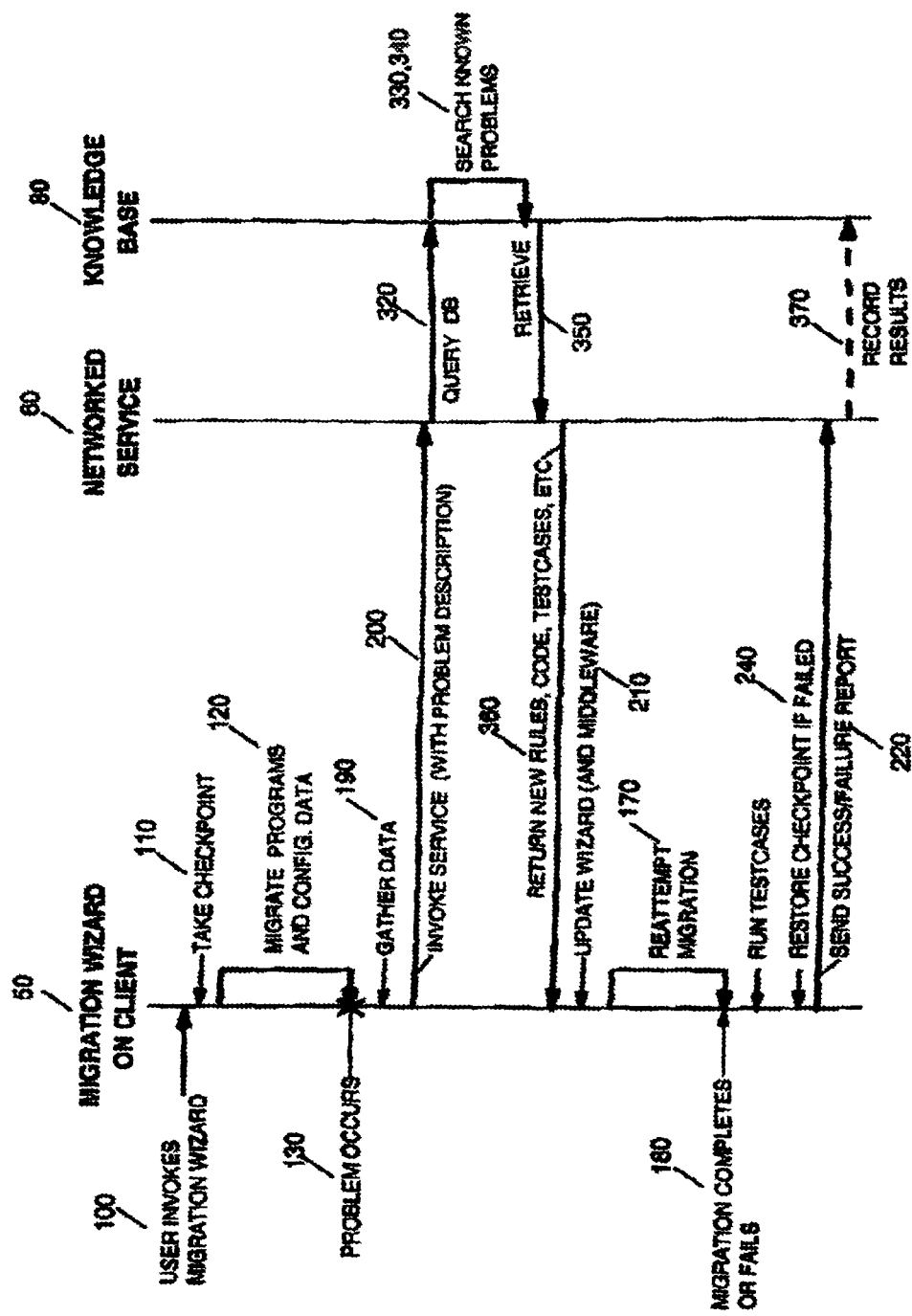
FIG. 2 is a schematic representation of a sequence of steps of a distributed migration method according to an embodiment of the invention.
Figure 3:
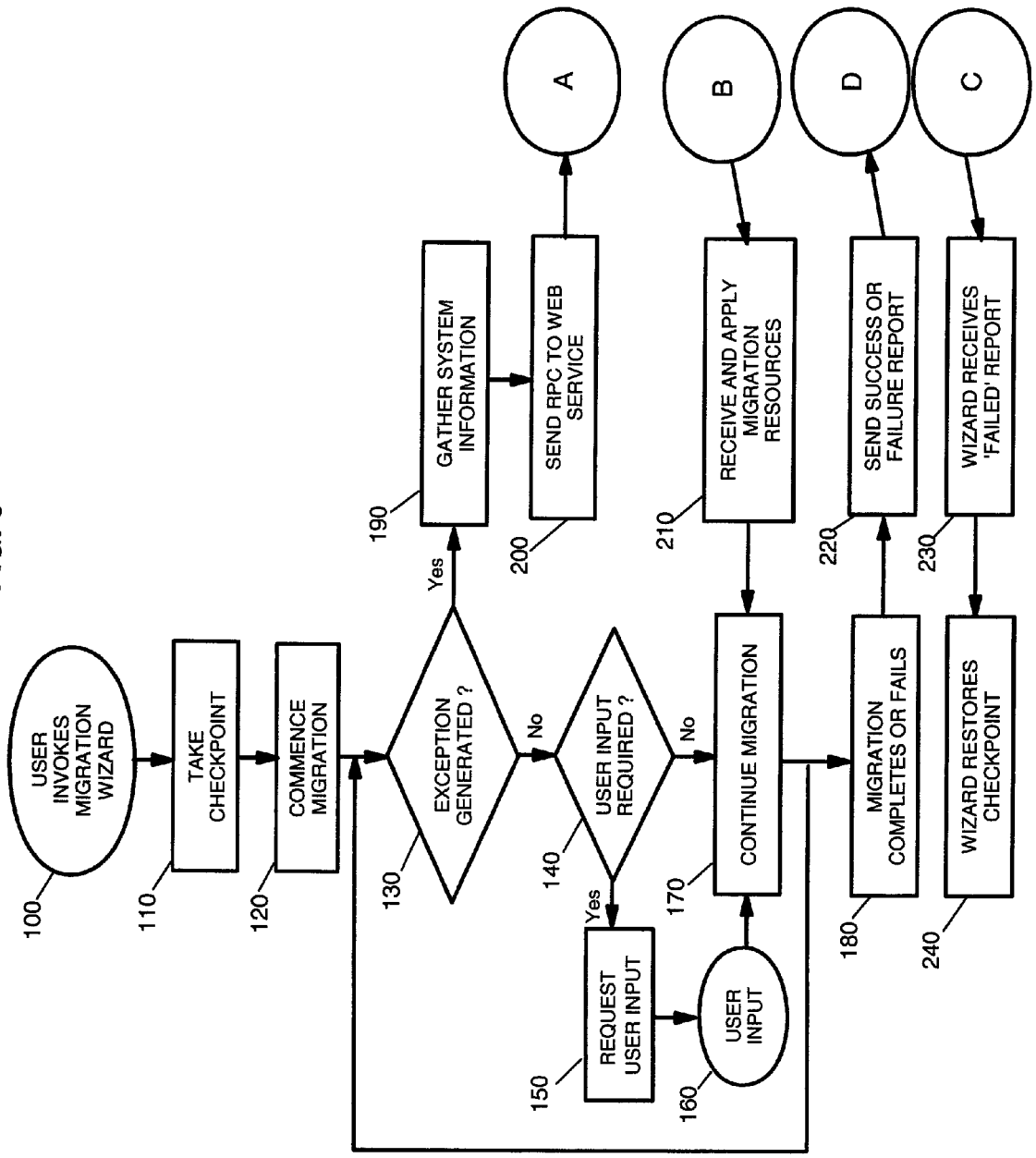
FIG. 3 is a more detailed representation of the steps of a method implemented by a migration wizard, according to an embodiment of the invention.

Referring to FIGS. 2 and 3, a user of the first embodiment of the invention starts the migration task by invoking 100 the migration wizard 50 in a conventional manner (for example by selecting from a set of tools and functions accessible via a user interface menu). When invoked, the migration wizard takes a checkpoint 110 (or snapshot) of the data processing environment and then starts migration 120. When user input is required 140 during the migration, a dialog box or window prompts 150 the user to select from a set of options or to type in data. The developer responds 160 to the migration wizard's user prompts 150 and the migration wizard steps 170 through a migration process—iteratively changing either the application program code and/or configuration information.

In some cases, as with conventional migration wizards, the migration wizard 50 may be able to complete 180 the migration task successfully with no external assistance (or with no external assistance other than the developer occasionally being asked to select from different options or to confirm that the process should continue). However, also consistent with conventional migration wizards, an unexpected configuration or a bug within the migration wizard or within the middleware may prevent the migration completing automatically without assistance. In an IDE, a source code migration may fail to complete because the user lacks the required permissions, or because of environmental errors such as lack of disk space. Other potential problems include compile errors, link errors and run time parsing errors (for example in XML (Extensible Markup Language)-based configuration files).

With conventional approaches to application migration, if an exception is generated or an error is identified, the user of the migration wizard is required to complete the failed migration task manually, or to call on other experts, or to install the latest available software patch for the migration wizard and retry the migration. The user may have to search an online database for details about a specific problem, perhaps having to search or attach many different log and configuration files. As well as the user effort and delay when manually following instructions to download new code and to install and run the code, users often have to guess which of a set of possible actions to take and there is plenty of scope for user errors. If new migration problems are encountered, the user has to start again, potentially making the problem worse—especially if the accumulated history of steps taken is lost.

Using the migration wizard of the present embodiment, manual intervention is not required after an error is identified or an exception is generated. Instead, as shown in FIGS. 2 and 3, the migration wizard 50 includes an exception handler that responds to any generated exception 130 or error message by gathering 190 information and invoking 200 a remote service via a network of data processing systems. The exception conditions that trigger execution of the exception handler functions may be any of the migration problems referred to below, including an unexpected program syntax or application program configuration for example. In this embodiment, the exception handler is a computer program component that identifies when certain exception conditions occur and responds by invoking a network-based service, but the exception handler may be implemented in any of a number of different programming languages or using an electronic logic circuit.

As shown schematically in FIG. 1, the network-based service is implemented by one or more computer programs 60, or a combination of hardware and software components, on a server data processing system 70 that is connected to the Internet (or within an Intranet or other network). The network-based service enables programmatic interaction between computer programs and data processing systems across the network.

The remote network-based service may be a web service. As is known in the art, web services can communicate and integrate with a variety of heterogeneous applications using shared and open communication protocols and technology standards, such as SOAP (Simple Object Access Protocol), UDDI (Universal Description, Discovery and Integration), and WSDL (web service Definition Language). Interaction between web services and other programs via the Internet, and interaction between different web services, facilitates dynamic integration between systems and programs and between different enterprises. Thus, web services facilitate integration and cooperation between suppliers and customers, and between other business partners.

The gathering 190 of data by the migration wizard 50, in response to an exception/error, comprises gathering local system data that is likely to be required by a typical web service. For example, the wizard may gather the version level of the IDE product, operating system and the currently installed middleware product, and the userID and operating system permissions. The wizard may also gather the amount of system memory and hard disk space which is currently free to receive new data.

The invocation of the network-based service 60 is achieved by the migration wizard 50 sending 200 a remote procedure call (RPC method invocation) to the server computer system 70 that is running one or more programs implementing a web service. The migration wizard 50 is preconfigured with identification of the communication endpoint and a transport mechanism (e.g. SOAP over HTTP (Hypertext Transfer Protocol)) for the migration-supporting web service 60. The client can respond to predefined exception conditions by invoking the web service, via a request sent to the specified end point using the specified transport mechanism.

The remote procedure call according to the present embodiment contains a problem description such as the error message or details of the exception that was generated when the migration encountered a problem requiring external assistance. In particular, the problem description may be inserted as parameters of the RPC (if only small and predictable objects are being inserted) or as attachments to the RPC. For example, a migration wizard that encounters an error when parsing an XML configuration file may send ("XML_PARSE_ERROR_ABC001 when parsing file Config.xml", "/var/log/logfile.txt") within the parameters of a RPC sent to the remote web service, attaching a particular log file "logfile.txt" that includes an identification of the encountered problem and a separate file that contains the gathered local system data.

Figure 4:
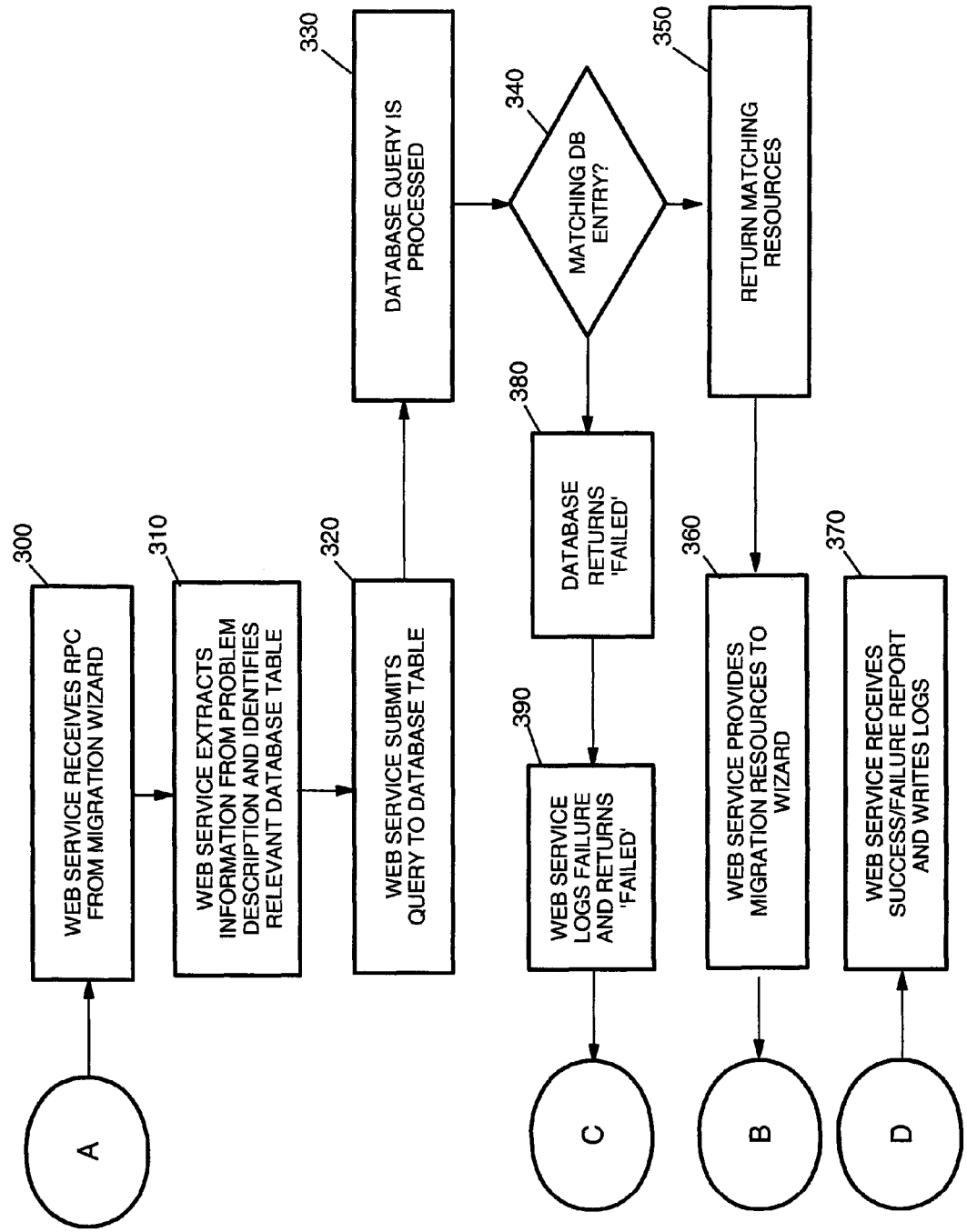
FIG. 4 is a more detailed representation of steps of a method implemented by a web service, according to an embodiment of the invention.

As shown in FIGS. 1, 2 and 4, the program or programs 60 implementing the web service are associated with a database 80 containing migration rules and information and, in this embodiment, also containing program code for use in resolving migration problems. The migration rules each describe actions to be taken to migrate a particular type of application or a particular configuration or to resolve one of a number of known problems. The program code available from the database 80 includes bug fixes and patches for migration wizards as well as software patches for application programs and application-support-infrastructure products, and executable testcases.

In other embodiments of the invention, the database 80 may contain only migration rules and instructions such that any required program code needs to be obtained elsewhere. In some cases, the database may provide information advising that an apparent problem can be safely ignored, in which case the user can select an option to proceed regardless of the apparent problem.

When the web service 60 receives 300 the RPC from the migration wizard 50, the web service 60 initiates a search through the database 80 for information, rules or program code associated with the problem identifier included in the RPC. The indexing of migration-support resources (such as information, rules, code patches and testcases) within a set of database tables of the knowledge base 80 typically involves human intervention, but the searching can be automated when a searchable database has been designed and populated. Information can be extracted 310 from the problem description and compared with an index of database tables to determine which table to search for a solution to the particular migration problem. The web service then submits 320 a query to an appropriate table of the database 80. Referring to the above example of a parsing error, the web service query includes "XML_PARSE_ERROR_ABC001 when parsing file Config.xml" as the primary key and "Config.xml" as the secondary key. The database query is processed 330 to identify matching migration-support resources for the particular migration problem. The database 80 may be located at the same data processing system as the web service programs 60 or may be remote from these programs 60.

In one embodiment of the invention, if a matching entry is found 340 within the database for a specified problem, the web service program 60 retrieves 350 a migration rule (or other resources such as information or programs) held in the database for that problem type. In some cases, a migration rule held in the database will define the next steps to be performed by the migration wizard—such as to replace a particular string with another string in a configuration file or within source code. The rule is downloaded 360 and used to update 210 the migration wizard, which performs the operation specified within the rule. For example, a rule to change XML within an application program may be encoded within an eXtensible Stylesheet Language Transformation (XSLT) template. In other cases, a code patch for fixing an error or adding a capability to the migration wizard is held in the database and can be downloaded and applied to the wizard. In some cases, the migration will then continue 170 and complete 180 successfully.

In the above examples, the migration wizard included an error or omitted part of a set of rules for dealing with a particular migration, and an automated invocation of and interaction with the web service was able to resolve the problem. In some cases, the involvement of the web service may even be invisible to the user, but it is more common for a user to be notified and asked for permission before any call is made to a remote service.

It can be seen that the web service provides enhanced support for automated migration, allowing new migration rules and code corrections to be provided by the service provider with minimal effort from end users.

When completion of the migration is reattempted, a success or failure of the migration can be communicated 220 back to the web service. This allows the web service to maintain 370 log records for (a) the migration problems that were experienced, (b) the rules and/or program code and/or information that was provided by the web service to the user's system in response to invocation of the web service, and (c) the success or failure of migration as a result of use of the web service. The database 80 may also be updated with the success or failure information, and the information can be used to further refine future responses to invocations of the web service. For example, a first weighting may be applied to resources within the database that were successful in resolving a particular migration problem, and a different weighting may be applied to resources that failed to resolve that problem. In this way, the knowledgebase may iteratively learn which resources are most effective for which types of problem. For example, the database update may result in a migration rule being flagged as unsuitable for a particular type of problem when it has failed to resolve such problems, or the update may result in increased use of a migration rule or patch when its effectiveness is confirmed for a particular problem.

The use of the migration-assistance web service may be an iterative process. As a first example, a migration instruction provided by the web service may involve undoing a partial migration (typically, by restoring the system to the previous checkpoint) and trying a new migration rule. Secondly, the process may be iterative because there are multiple errors or multiple elements of a configuration that were not expected by the migration wizard. Resolution of a first problem using the web service may allow the migration to progress, but the web service may be required again before the migration can complete successfully.

Figure 5:
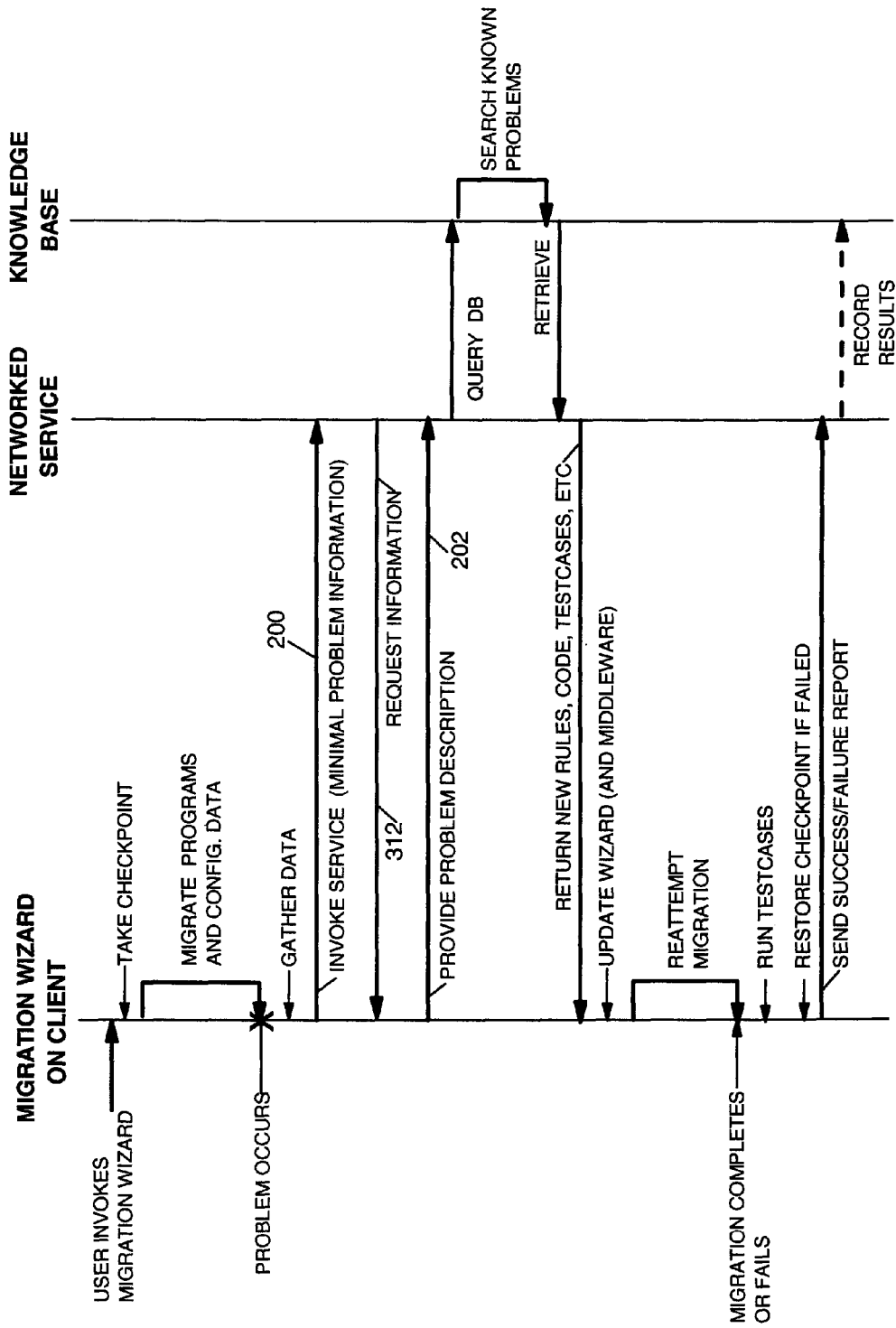
FIG. 5 shows a sequence of steps of a method according to an alternative embodiment.

Thirdly, the initial processing 310 by the web service 60 or the initial search 330 of the database 80 may identify further information that is required to resolve the identified problem. This may arise where the web service invocation 200 includes an error message or other identification of an exception but does not include comprehensive information about the particular problem—for example where multiple problems are reported by the same error message or exception. In this case, as shown in FIG. 5, the first response to a remote service invocation may be a request 312 from the web service program 60 to the migration wizard 50 for more information regarding the problem that has occurred, or information regarding the application program, configuration information or other resources that are being migrated. The web service may request that information by sending an executable data gathering program to the migration wizard, but the web service preferably sends a request 312 such as an SQL (Structured Query Language) query rather than executable code. The migration wizard obtains the additional information and returns 202 the information to the web service, which may then initiate 320 a database search 330 to find relevant migration resources. The process then continues as described above with reference to FIG. 2.

Figure 6:
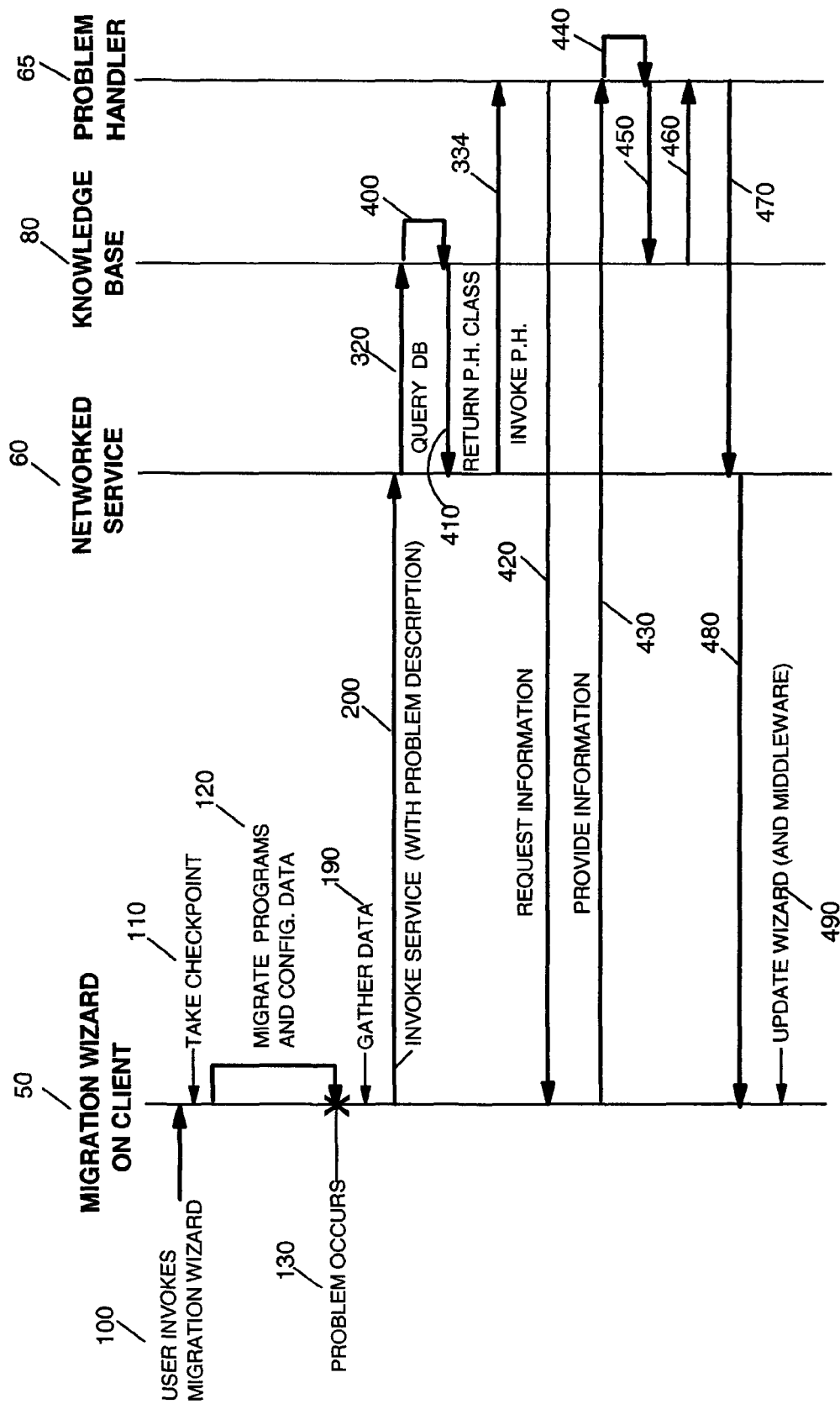
FIG. 6 shows a sequence of steps according to a further embodiment.

Another embodiment of the invention is described below in detail with reference to FIG. 6 and with reference to an example error that is encountered during migration. When the web service queries 320 the database 80 (for example using the primary and secondary keys set out above), the processing 400 of the database query does not immediately return migration rules, code patches and so on. The migration wizard may have provided only minimal problem-related information to the web service, only identifying a problem type for the encountered problem. The database query compares this problem type information with information held in the database that associates problem types with particular problem handlers. The database returns 410 the name of a local ProblemHandler class that knows how to deal with certain problems of the specified type. The web service then instantiates 334 the identified ProblemHandler class. The problem handlers 65 may be implemented as components of the local web service programs 60, or within a remote service.

Referring to the above example of an XML parsing error when parsing file Config.xml, the problem handler 65 may determine that the file Config.xml or more information about the problem should be obtained from the IDE. The problem handler 65 sends the migration wizard a request 420 to upload the file Config.xml or other required information. The migration wizard provides 430 the file Config.xml or required information to the web service (typically via FTP (File Transfer Protocol) if a file is being uploaded, and typically after requesting permission from the user). Assuming file Config.xml is uploaded, a process identified by the problem handler now attempts 440 to parse the file Config.xml. In this example, the problem handler receives an error

TABLE-US-00001    XML_PARSE_ERROR_BAD_NAMESPACE".

This error message includes additional detail to the original error message. The problem handler queries 450 the database with the primary key
"XML_PARSE_ERROR_BAD_NAMESPACE",
and secondary key
"Config.xml".

In this example, the problem handler receives 460 an XSLT (Extensible Stylesheet Language Transformations) document that is suitable for use to correct the problem in the source code. The problem handler returns 470 this XSLT document to the web service, and the web service returns 480 the XSLT document to the migration wizard. The migration wizard now applies 490 the XSLT document to file Config.xml, which results in defective tags of the form <tag action="load"/> being converted to a corrected form <xmlns: MigratedApp tag action="load"/>. Having taken the corrective action, the migration wizard prompts the user to initiate a revalidation of the application.

If the user responds positively to the prompt, migration is reattempted and may proceed 170 as described above with reference to FIG. 2.

In some cases, when the developer retries the application migration, migration proceeds successfully 170, 180. As mentioned above with reference to FIGS. 3 and 4, the migration wizard may then report 220 the success (perhaps only if requested by the user)—returning the parameters that are required by the web service to log 370 the migration result. The migration wizard may then prompt the developer to choose whether to delete the checkpoint system image that was taken before migration commenced. If the user opts to delete the checkpoint image, this delete action is performed by the migration wizard.

In other embodiments of the invention, fully automated resolution of migration problems may not be possible. However, this does not imply that the web service is not helpful in such situations. A web service that provides more comprehensive (or easier to understand) instructions for migration or a mere clarification of the error messages produced by the migration tool can be very helpful even if the user has to perform some operations manually. For example, the user may be instructed to try manual steps such as correcting a library path definition or installing pre-requisite software. A software patch for fixing a bug within the migration wizard is helpful even if the user has to reinstall the wizard.

Furthermore, a central repository for logging migration problems and storing migration problem information is useful even when a particular user in unable to obtain a complete solution immediately. This is useful because the logging of problems 390 and confirmation 390,230 of a lack of current availability of a solution provides a quick confirmation that assistance is needed from service experts (avoiding the user wasting time trawling through an online database in an attempt to find a non-existent solution) as well as providing information that helps the service provider to determine which problems are occurring and which problems need most urgent attention to provide a solution. As shown in FIG. 4, a failure to identify 340 a matching database entry for the particular migration problem is reported 380 back to the web service, which logs 390 the failure and reports back to the migration wizard 390,230. The migration wizard can respond by returning 240 the partially migrated resources to the original checkpoint and reporting the failure to the user. The user can submit a request for notification when the web service has been updated with a solution that is relevant to this problem type, to enable a later retry of the migration process. Alternatively, the user that receives a failure report may wish to hand-off full responsibility for completing the migration to a service provider at this point.

In the above-described example embodiments, the migration wizard invokes the web service which provides rules, program code or information back to the migration wizard. The migration wizard then reattempts migration on the user's local data processing system 40. In another embodiment of the invention, more of the processing is performed on a remote system by the web service. In this case, and subject to any required permission from the user or a system administrator, the web service initiates an upload (via ftp) of details of the configuration or portions of the source code that encountered the migration problem. Explicit permission is likely to be required, although there may be exceptions such as if the web service is a resource provided by the user's employer for internal use within that employer's business.

This uploading of information allows the web service to analyze the problem in more detail and to implement a more comprehensive search for known solutions to the problem. Uploading to the web service may increase the likelihood of being able to implement an automated solution. Furthermore, if the web service is unable to implement a fully automated solution, the service provider can assign service personnel to the task of solving this specific problem using the uploaded details. In this way, the use of the cooperating migration wizard and web service of the present invention enables service providers to offer a two-tier service whereby automated migration is more likely to succeed than when conventional approaches are used, and service personnel can be focused on the subset of migration problems for which a fully automated solution is not currently available.

A further embodiment of the invention implements a reduced-function migration wizard. The primary function of the reduced-function migration wizard is to invoke a remote migration-support service. That is, instead of the migration wizard executing functions and implementing rules to migrate a computer program to a different operating environment, the migration wizard's primary role is to invoke a remote service to perform such functions. When invoked by a user, or when triggered by an exception or error, a migration wizard according to this embodiment of the invention takes a checkpoint of the operating environment before migration, and gathers local system information for sending to the remote service. The remote service and wizard then cooperate to download information and program code from a remote server to the wizard to perform the migration; or cooperate to upload required information and to perform the migration at the remote server. Such a reduced-function migration wizard omits many target-program-specific functions that are a feature of some migration wizards, and so a reduced-function migration wizard may be generic to a number of different application-support-infrastructure products.

Figure 7:
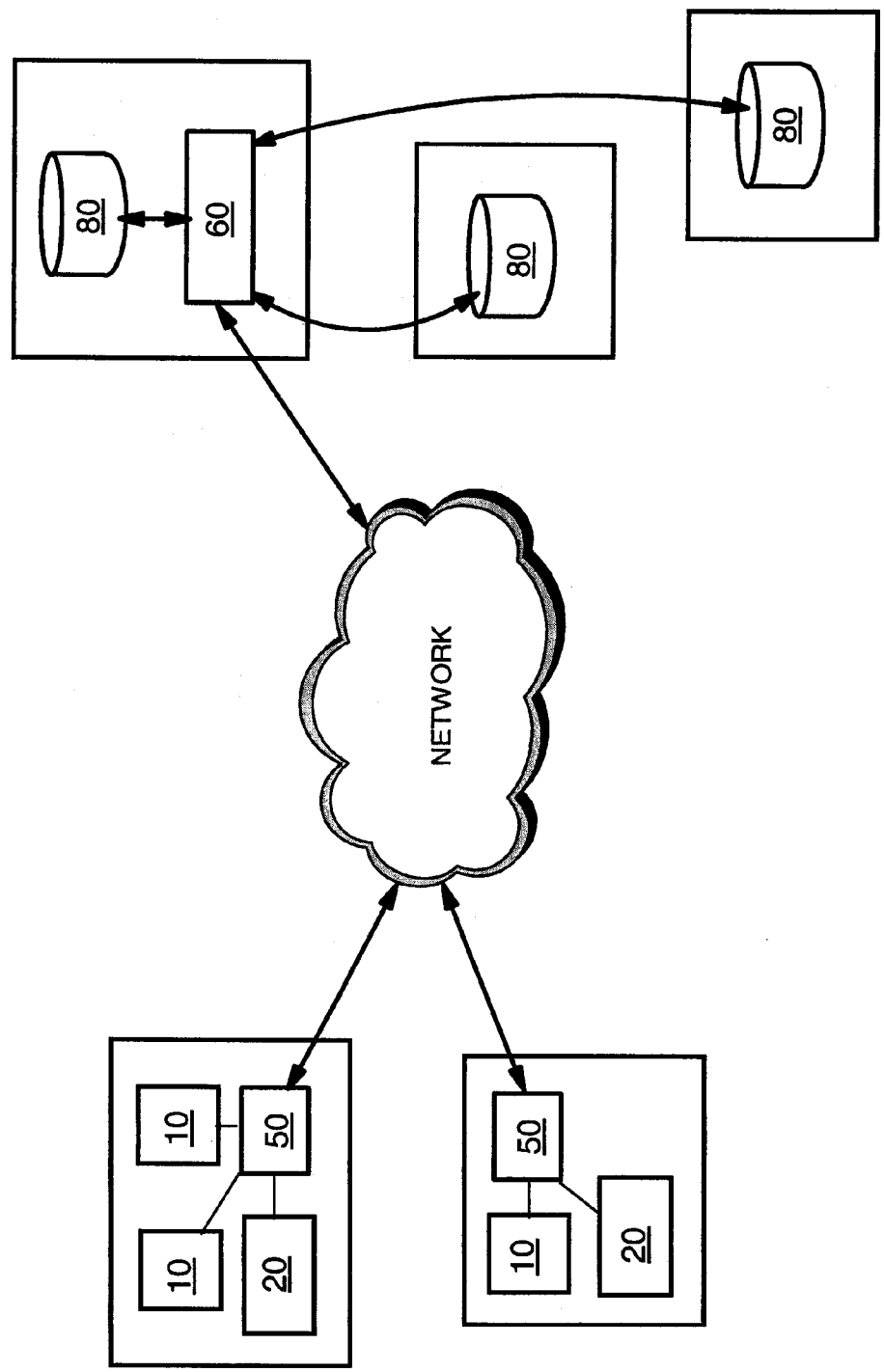
FIG. 7 is a schematic representation of a second data processing network in which the present invention may be implemented.

Example embodiments of the invention described above were applied to the problem of migrating source code and metadata within an Integrated Development Environment. The invention is also applicable to migrating data processing resources within a run-time environment such as shown in FIG. 7, for example when migrating legacy applications to a new version of an application-support-infrastructure product (such as a middleware product) and its associated metadata. The run-time environment may include one or more applications using an application server that has been superseded or enhanced with new features. A user of the application server who wishes to exploit the new features or otherwise take advantage of the superseding product may need to carry out a migration.

When carrying out a migration within a run-time environment, a number of problems may arise that differ from the typical problems arising in an IDE. For example, the new application-support-infrastructure product or the application program may fail to start. Error messages may be generated, such as "file not found" errors, or the system may encounter problems associated with incorrect file permissions. An embodiment of the present invention can mitigate these problems, using the same operational sequence as described above with reference to any of FIG. 2, 5 or 6 to migrate object code artifacts and metadata.

In such a run-time environment, examples of the rules that may be provided by the web service include an instruction (automated or otherwise) to install a patch in which the particular problem has been resolved, and then to perform the migration. Alternatively or additionally, the web service may provide a script or executable program to be run by the migration tool to correct configuration errors or create symbolic links, etc. The web service may change a configuration— creating missing artifacts. The web service may be checking multiple databases for resources that are relevant to a particular problem. As described above in the context of migrating source code, the web service may instruct the user or automatically control the migration wizard to undo certain migration operations and then to try a new rule.

One embodiment described in detail above involves sending a RPC to the data processing system running the web service programs. It will be understood by persons skilled in the art that a more loosely coupled web services implementation can be used, with an alternative to RPC providing the service invocation. For example, a message-based Service Oriented Architecture (SOA) may be used, or RESTful (REpresentation State Transfer) web services may be used where the focus is on interaction between stateful resources rather than messages or method calls.

In some embodiments of the invention, a migration may appear to complete successfully and yet a problem is identified later, such as when a developer attempts to start a migrated application and this attempt fails. In such a situation, a developer or application user can interact with the migration wizard to invoke a migration problem analysis. For example, a user may select an option to investigate a problem in response to a pop-up error message, or the user may select from user interface menu options such as:

Tools→Migration→Failed migration analysis.

The migration wizard responds by presenting a window on the user's computer display screen and prompts the user to identify files indicating a failed migration. The user selects the file/var/log/logfile.txt from a list of standard files. The wizard then prompts the user to indicate where in this file the relevant error message begins. For example, the relevant error may not be the first error message. The user then selects an error message, for example "XML_PARSE_ERROR_ABC001 when parsing file Config.xml", and this is effective to prompt the migration wizard to gather local system information and to send the problem description and gathered local system information to the web service. Thus, the sequence of operations following identification of a problem can be precisely as described above; or at least the sequence following user selection of the file and error may be precisely as described above for a more automated web service invocation.

One of the embodiments described above involved a service provider offering a two-tier service, in which migration problems that cannot be resolved by a simple download of rules or code patches may be resolved manually by service experts. Such a service may be provided on-line, since the migration wizard could allow the user to 'transfer' the failing migration to the service provider. The service provider may be a vendor of an application-support infrastructure product, whose product is replacing an earlier version of the same product or is replacing a different product, or the service provider may be a business partner of the product vendor. Such a transfer may involve service experts from the service provider logging onto the user's machine(s) directly in order to complete the migration process. Alternatively, where feasible and appropriate, a complete copy of the artifacts that require migration could be transferred electronically to the service provider. In such examples, the migration wizard is a participant in a long-running business process that could in theory allow the user to purchase a support contract, transfer the migration activity, receive notification of its completion, and be billed accordingly. Various options exist for notifying the user of completion of the migration. The migration wizard could receive a notification of completion from the service provider if implemented using technologies such as asynchronous web services or AJAX (Asynchronous Javascript And XML). Users could also receive notifications of completion via email, phone calls and the like. Some migrations might take several days or more to complete. It should be noted that the migration controller is not necessarily running on the user's machine. This component of the solution may be located on a network-connected data processing system to which the user connects when wishing to request a migration service. The migration service provider then performs the migration process on behalf of the remote user, typically under a service contract for a pre-arranged fee.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A data processing system for supporting migration of data processing resources from a first operating environment to a second operating environment, comprising:
   a hardware data processing unit configured to
      invoke a migration wizard;
      invoke a remote network-based service by an exception handler upon identifying an exception condition;
      send information related to the exception condition to the remote network-based service;
      receive, via the network, from the remote network-based service a migration rule for handling the exception condition; and
      perform operation specified in the migration rule;
   wherein the remote network-based service is associated with a knowledge database containing migration rules for handling known exception conditions and selects the migration rule based on the information received from the exception handler.

2. The data processing system according to claim 1, wherein the remote network-based service is a web service implementing SOAP (Simple Object Access Protocol)-formatted messaging.

3. The data processing system according to claim 2, wherein the data processing unit is further configured to upload elements of the data processing resources that require migration.

4. A method executed by a central processing unit (CPU) for use in migrating data processing resources from a first operating environment to a second operating environment, said method comprising:
   invoking a migration wizard;
   invoking a remote network-based service by an exception handler upon identifying an exception condition;
   sending information related to the exception condition to the remote network-based service;
   receiving, via the network, from the remote network-based service a migration rule for handling the exception condition; and
   performing operation specified in the migration rule;
   wherein the remote network-based service is associated with a knowledge database containing migration rules for handling known exception conditions and selects the migration rule based on the information received from the exception handler.

5. The method according to claim 4, further comprising:
   receiving a request from the remote network-based service for additional information relating to the identified exception condition; and
   sending the requested additional information to the remote network-based service;

wherein the remote network-based service, in response to receipt of said additional information, using said additional information for selection of the migration rule.

6. The method according to claim 5 wherein the remote network-based service is a web service implementing SOAP-formatted messaging.

7. The method according to claim 6 further comprising uploading elements of the data processing resources that require migration.

8. A computer program product for assisting migration of data processing resources from a first operating environment to a second operating environment, said computer program product comprising a computer usable storage medium having computer usable program code embodied therewith, said computer usable program code, when executed on a computer, instruct the computer to perform the operations comprising:

invoking a migration wizard;
   invoking a remote network-based service by an exception handler upon identifying an exception condition;
   sending information related to the exception condition to the remote network-based service;
   receiving, via the network, from the remote network-based service a migration rule for handling the exception condition; and
   performing operation specified in the migration rule;
   wherein the remote network-based service is associated with a knowledge database containing migration rules for handling known exception conditions and selects the migration rule based on the information received from the exception handler.

9. The computer program product according to claim 8 further comprising:

receiving a request from the remote network-based service for additional information relating to the identified exception condition, and
   sending the requested additional information to the remote network-based service;
   wherein the remote network-based service, in response to receipt of said additional information, using said additional information for selection of the migration rule.

10. The computer program product according to claim 9 wherein the remote network-based service is a web service implementing SOAP-formatted messaging.

11. The computer program product according to claim 10 further comprising uploading elements of the data processing resources that require migration.

* * * * *